United States Patent
Wang et al.

(10) Patent No.: US 9,116,778 B2
(45) Date of Patent: Aug. 25, 2015

(54) REMOTABLE PROJECT

(75) Inventors: Enzhou Wang, Bellevue, WA (US); Riyaz Habibbhai, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 688 days.

(21) Appl. No.: 12/769,673

(22) Filed: Apr. 29, 2010

(65) Prior Publication Data
US 2011/0271249 A1    Nov. 3, 2011

(51) Int. Cl.
*G06F 9/44*    (2006.01)

(52) U.S. Cl.
CPC .......................................... *G06F 8/70* (2013.01)

(58) Field of Classification Search
None
See application file for complete search history.

(56) References Cited

U.S. PATENT DOCUMENTS

| | | | |
|---|---|---|---|
| 5,511,197 A | 4/1996 | Hill et al. | |
| 5,659,735 A * | 8/1997 | Parrish et al. | 717/121 |
| 5,819,093 A | 10/1998 | Davidson et al. | |
| 5,828,840 A | 10/1998 | Cowan et al. | |
| 5,907,705 A * | 5/1999 | Carter | 717/122 |
| 6,263,456 B1 | 7/2001 | Boxall et al. | |
| 6,393,437 B1 | 5/2002 | Zinda | |
| 6,405,364 B1 * | 6/2002 | Bowman-Amuah | 717/102 |
| 6,550,057 B1 * | 4/2003 | Bowman-Amuah | 717/101 |
| 6,567,767 B1 * | 5/2003 | Mackey et al. | 702/186 |
| 6,601,233 B1 * | 7/2003 | Underwood | 717/101 |
| 6,718,535 B1 * | 4/2004 | Underwood | 717/120 |
| 6,836,885 B1 * | 12/2004 | Buswell et al. | 717/172 |
| 7,051,036 B2 * | 5/2006 | Rosnow et al. | 717/101 |
| 7,093,232 B1 * | 8/2006 | Chatzigianis et al. | 717/122 |
| 7,131,071 B2 * | 10/2006 | Gune et al. | 717/102 |
| 7,194,730 B2 * | 3/2007 | Pramberger | 717/120 |
| 7,275,236 B1 * | 9/2007 | Kabe | 717/121 |
| 7,383,535 B1 * | 6/2008 | Kshetrapal et al. | 717/122 |
| 7,444,337 B2 | 10/2008 | Zhou et al. | |
| 7,565,643 B1 * | 7/2009 | Sweet et al. | 717/102 |
| 7,685,159 B2 * | 3/2010 | Mitchell et al. | 717/122 |
| 7,890,926 B2 * | 2/2011 | Balathandapani et al. | 717/107 |
| 7,917,888 B2 * | 3/2011 | Chong et al. | 717/102 |
| 7,945,949 B2 * | 5/2011 | Johnson | 726/5 |

(Continued)

FOREIGN PATENT DOCUMENTS

| | | |
|---|---|---|
| CN | 101416173 A | 4/2009 |
| WO | 2007123785 A2 | 11/2007 |

(Continued)

OTHER PUBLICATIONS

Ryan, "Web-Based Java Integrated Development Environment", 2007, dissertation of Division of INformatics, University of Edinburgh; [retrieved on Nov. 21, 2012]; Retrieved from Internet <URL: http://www.willryan.co.uk/Dissertation.pdf;pp. 1-79.*

(Continued)

*Primary Examiner* — Xi D Chen
(74) *Attorney, Agent, or Firm* — Ben Tabor; Kate Drakos; Micky Minhas (57) ABSTRACT

Aspects of the subject matter described herein relate to remote project access. In aspects, project data for a project that is hosted on a server is provided to a client for use in a development environment of the client. A development environment may be instantiated and configured to allow a user to interact with the project as if the project existed solely on the client. Components on the client and server take care of transferring data and messages to and from the server to ensure that the user experience is seamless.

16 Claims, 7 Drawing Sheets

(56) References Cited

U.S. PATENT DOCUMENTS

| | | | | |
|---|---|---|---|---|
| 7,950,024 | B2* | 5/2011 | Schmidt et al. | 719/328 |
| 7,992,132 | B2* | 8/2011 | Fernando et al. | 717/120 |
| 8,239,824 | B2* | 8/2012 | Cifra et al. | 717/109 |
| 8,245,192 | B1* | 8/2012 | Chen et al. | 717/103 |
| 8,281,288 | B1 | 10/2012 | Spencer | 717/140 |
| 8,291,408 | B1 | 10/2012 | Czymontek | 717/103 |
| 8,296,720 | B2* | 10/2012 | Coulthard et al. | 717/103 |
| 8,296,722 | B2* | 10/2012 | Yoshihama et al. | 717/121 |
| 8,341,590 | B1* | 12/2012 | Poole | 717/121 |
| 8,352,913 | B2* | 1/2013 | Sakhare et al. | 717/122 |
| 8,584,081 | B2* | 11/2013 | Fernando et al. | 717/120 |
| 8,667,465 | B2* | 3/2014 | Poole | 717/121 |
| 8,880,678 | B1* | 11/2014 | Colton et al. | 717/103 |
| 8,966,434 | B2* | 2/2015 | Perisic et al. | 717/102 |
| 2002/0040469 | A1* | 4/2002 | Pramberger | 717/121 |
| 2003/0192029 | A1* | 10/2003 | Hughes | 717/101 |
| 2004/0003119 | A1* | 1/2004 | Munir et al. | 709/246 |
| 2004/0221017 | A1* | 11/2004 | Yoon | 709/217 |
| 2005/0055665 | A1 | 3/2005 | Woo | |
| 2005/0120072 | A1 | 6/2005 | Miyazaki et al. | |
| 2006/0070020 | A1* | 3/2006 | Puttaswamy et al. | 717/103 |
| 2006/0116991 | A1 | 6/2006 | Calderwood | |
| 2006/0150144 | A1 | 7/2006 | Balathandapani | |
| 2007/0226678 | A1* | 9/2007 | Li et al. | 717/101 |
| 2008/0016245 | A1 | 1/2008 | Cunningham et al. | |
| 2008/0059943 | A1* | 3/2008 | Krevs et al. | 717/103 |
| 2008/0196000 | A1* | 8/2008 | Fernandez-Ivern et al. | 717/101 |
| 2008/0244062 | A1* | 10/2008 | Elangovan et al. | 709/224 |
| 2008/0313504 | A1 | 12/2008 | Wedel et al. | |
| 2009/0210862 | A1 | 8/2009 | Viswanadha et al. | |
| 2009/0217240 | A1 | 8/2009 | Motoyama et al. | |
| 2010/0293527 | A1* | 11/2010 | Austin et al. | 717/113 |
| 2011/0258598 | A1* | 10/2011 | Fernando et al. | 717/120 |
| 2012/0079389 | | 3/2012 | Tsao | |
| 2013/0326468 | A1* | 12/2013 | Li et al. | 717/101 |
| 2014/0040752 | A1 | 2/2014 | Tsao | |

FOREIGN PATENT DOCUMENTS

| | | |
|---|---|---|
| WO | 2008051695 A1 | 5/2008 |
| WO | 2008115645 A1 | 9/2008 |

OTHER PUBLICATIONS

Patent Trial and Appeal Board, *Ex Parte Mewherter*; 2012; [retrieved on Nov. 28, 2011]; Retrieved from internal emails circulated within the patent corp of USPTO;pp. 1-20.*

Banavar, et al., "Layered Server-based Support for Object-Oriented Application Development"; 1995 IEEE; ,[retrieved on Oct. 5, 2014]; Retrieved from Internet <URL:http://ieeexplore.ieee.org/stamp/stamp.jsp?tp=&arnumber=470585 >;pp. 2-11.*

Park, et al., "Library Support in an Actor-Based Parallel Programming Platform";2011 IEEE; [retrieved on Oct. 5, 2014]; Retrieved from Internet <URL:http://ieeexplore.ieee.org/stamp/stamp.jsp?tp=&arnumber=5738704 >;pp. 340-353.*

Bjornesson, Shrira; "BuddyCache: High-Performance Object Storage for Collaborative Strong-Consistency Applications in a WAN"; 2002 ACM; [retrieved on Oct. 5, 2014]; Retrieved from Internet <URL:http://dl.acm.org/citation.cfm?id=582419 >;pp. 26-39.*

Alameda, et al., "The Eclipse Parallel Tools Platform"; 2012 ACM; [retrieved on Oct. 5, 2014]; Retrieved from Internet <URL:http://dl.acm.org/citation.cfm?id=2335755>;pp. 1-8.*

Salinger, et al., "Saros an Eclipse Plug-in for Distributed Party Programming", 2010 ACM; [retrieved on Apr. 10, 2015]; Retrieved from Internet <URL:http://dl.acm.org/citation.cfm?id=1833310.1833319>;pp48-55.*

Xiao, et al., "On-line Collaborative Software Development via Wiki"; 2007 ACM; [retrieved on Apr. 10, 2015]; Retrieved from Internet <URL:http://dl.acm.org/citation.cfm?id=1296951.1296970>;pp177-183.*

Boukerche, Al-Shaikh, "Towards Building a Fault Tolerant and Conflict-Free Distributed File System for Mobile Clients"; 2006 IEEE; [retrieved on Apr. 10, 2015]; Retrieved from Internet <URL:http://ieeexplore.ieee.org/stamp/stamp.jsp?tp=&arnumber=1620413>;pp1-6.*

Xhafa, "Data Replication and Synchronization in P2P Collaborative Systems", 2012 IEEE; [retrieved on Apr. 10, 2015]; Retrieved from Internet <URL:http://ieeexplore.ieee.org/stamp/stamp.jsp?tp=&arnumber=6184987>;pp1.*

"International Search Report", Mailed Date: Feb. 28, 2012, Application No. PCT/US2011/034008, Filed Date: Apr. 26, 2011, pp. 9.

Lu, et al., "Trust-Based Privacy Preservation for Peer-to-peer Data Sharing", Retrieved at <<www.cs.purdue.edu/homes/bb/SKM-P2P-Stream.pdf—United States>>, IEEE Transactions on Systems, Man and Cybernetics, Part A: Systems and Humans, May, 2006, vol. 36, No. 3, pp. 7.

"ClientSideWebAppDevProposal", Retrieved at << http://wiki.netbeans.org/ClientSideWebAppDevProposal >>, Retrieved Date: Feb. 4, 2010, pp. 6.

"ASP Studio", Retrieved at << http://www.sharewareconnection.com/asp-studio.htm >>, Retrieved Date: Feb. 4, 2010, pp. 3.

Spritzler, Mark., "Debugging Server-side Code through IntelliJ IDEA with BEA Weblogic 8.1", Retrieved at << http://www.javaranch.com/journal/200408/DebuggingServer-sideCode.html >>, Retrieved Date: Feb. 4, 2010, pp. 7.

European Patent Application No. 11777932.2, Extended European Search Report dated Nov. 22, 2013, 8 pages.

European Patent Application No. 11777932.2, Communication Pursuant to Rules 70(2) and 70a(2) dated Dec. 10, 2013, 1 page.

European Patent Application No. 11777932.2, Amendment dated Jun. 2, 2014, 23 pages.

Chinese Patent Application No. 201180020993.3, Second Office Action dated Mar. 4, 2015, 12 pages (including English translation of Notice).

"First Office Action and Search Report Issued in Chinese Patent Application No. 201180020993.3", Mailed Date: Jun. 30, 2014, 16 Pages.

Chinese Patent Application No. 201180020993.3, Amendment dated Nov. 15, 2014, 17 pages (including English translation of claim amendments and Summary of Response to 1st OA).

Chinese Patent Application No. 201180020993.3, Response to Second Office Action dated May 19, 2015, 15 pages (including English translation).

* cited by examiner

REMOTABLE PROJECT

BACKGROUND

Some server architectures allow an application to execute on a server while allowing users to interact with the applications via an Internet browser, custom client side application, or the like. For example, a server may allow a user to view and/or edit a document that physically resides on the server without downloading the document to a client machine. When a document is associated with a macro or some other executable code that a user may want to view or change, providing a seamless user experience is problematic.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to remote project access. In aspects, project data for a project that is hosted on a server is provided to a client for use in a development environment of the client. A development environment may be instantiated and configured to allow a user to interact with the project as if the project existed solely on the client. Components on the client and server take care of transferring data and messages to and from the server to ensure that the user experience is seamless.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment." Other definitions, explicit and implicit, may be included below.

Exemplary Operating Environment

Figure 1:
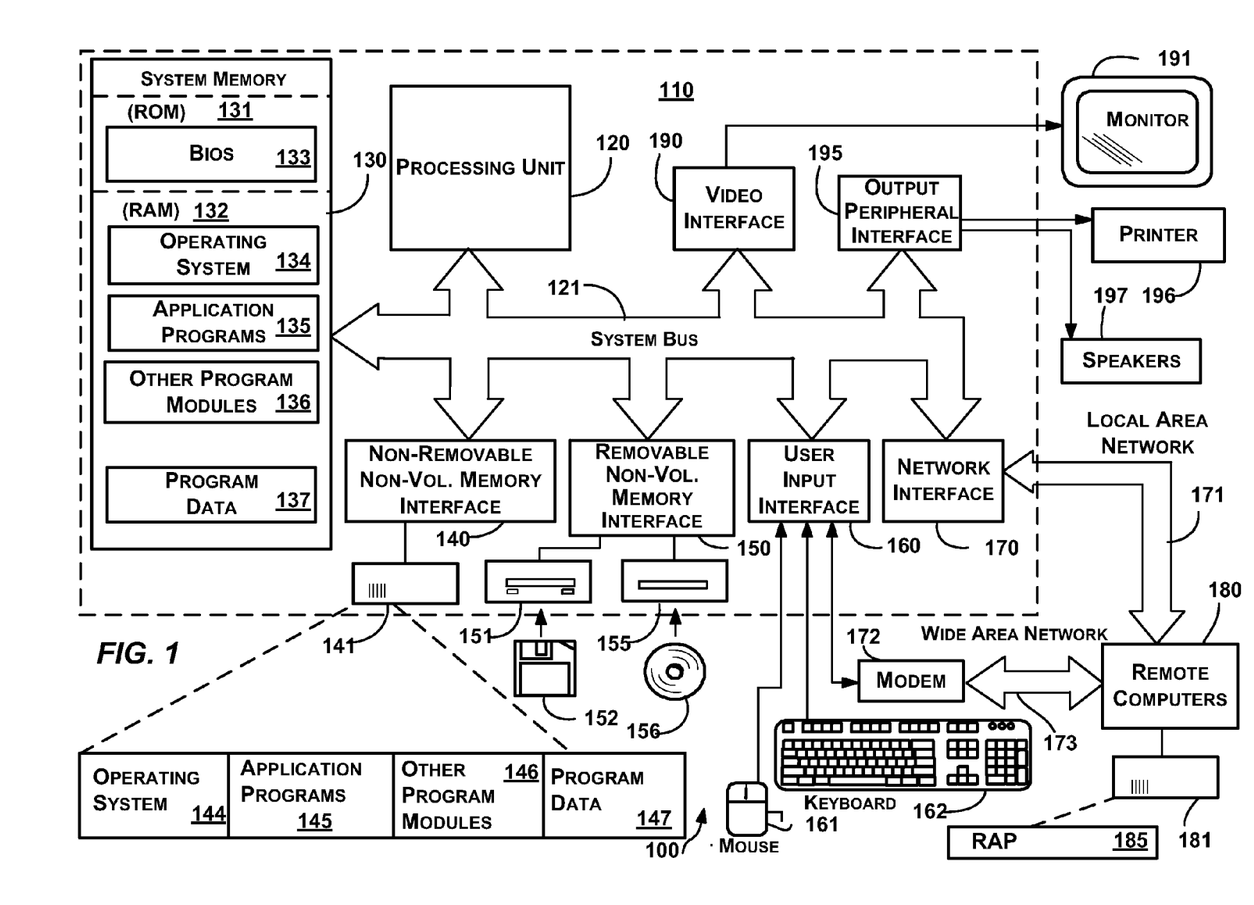
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and non-volatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Remote Project Access

Figure 2:
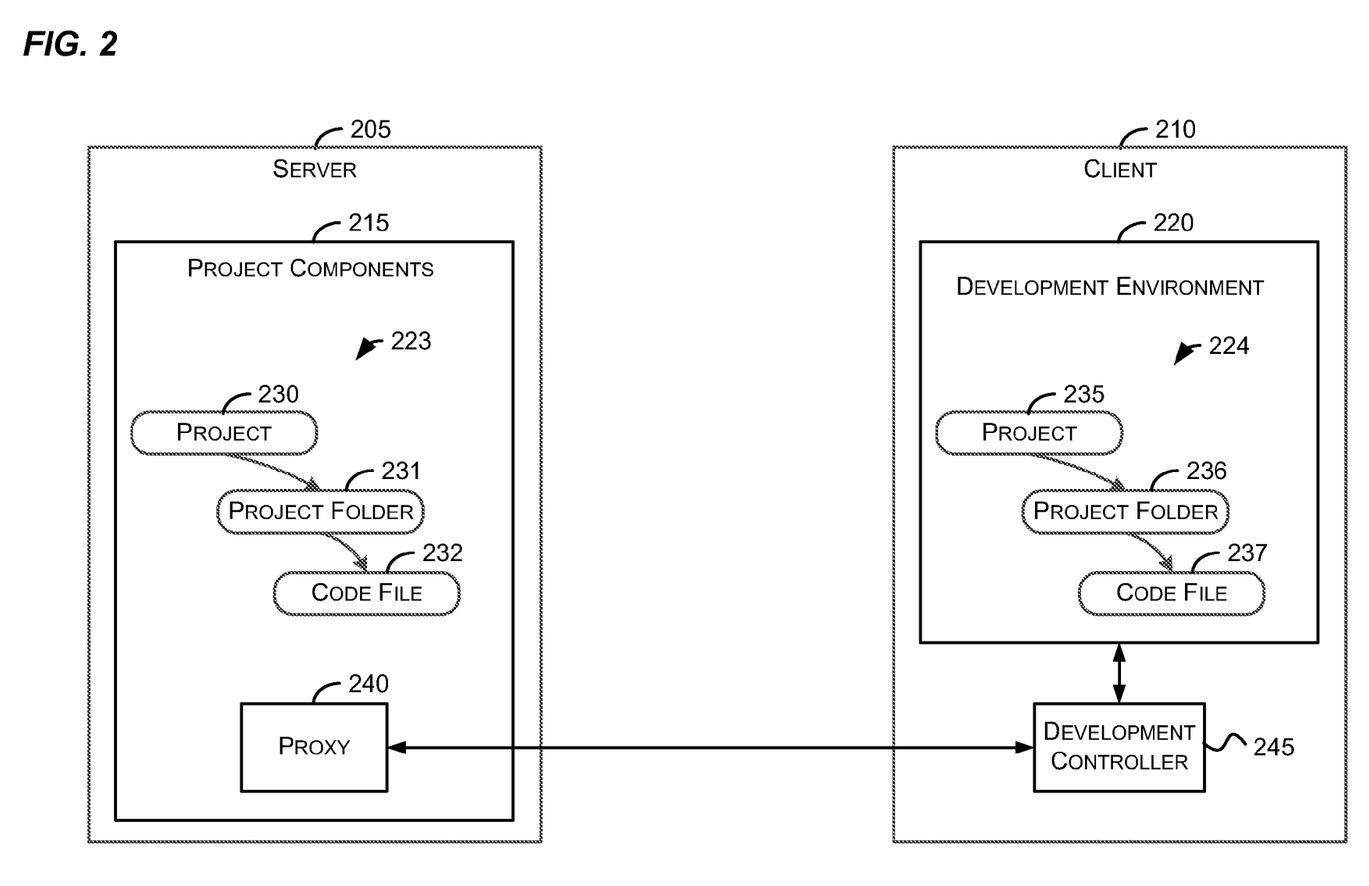
FIG. 2 is a block diagram that generally represents an exemplary environment in which aspects of the subject matter described herein may be implemented.

As mentioned previously, when a document hosted on a server is associated with a macro or some other executable code that a user may want to view or change, providing a seamless user experience is problematic. FIG. 2 is a block diagram that generally represents an exemplary environment in which aspects of the subject matter described herein may be implemented. The environment may include a server 205 a client 210, and other entities (not shown).

The server 205 and the client 210 may be implemented on or as one or more computers (e.g., the computer 110 as described in conjunction with FIG. 1). Although the terms "client" and "server" are sometimes used herein, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. At times, two or more entities that more frequently act as a client or server may concurrently be peers, servers, or clients. In an embodiment, a client and server may be implemented on the same physical machine.

Furthermore, as used herein, each of the terms "server" and "client" may refer to one or more physical or virtual entities, one or more processes executing on one or more physical or virtual entities, and the like. Thus, a server may include an actual physical node upon which one or more processes execute, a virtual node upon which one or more processes execute, a service executing on one or more nodes, a group of nodes that together provide a service, and the like. A service may include one or more processes executing on one or more physical or virtual entities. Furthermore, a single process may implement one or more servers.

The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or located on a single device.

The server 205 may host project components 215 that may include components for compiling, executing, validating, modifying, or otherwise manipulating software projects. Shown within the project components are blocks representing a project 223. In main memory of the server 205, data structures may be used to represent the project 230, the project folder 231, and the code file 232. These data structures may be of a form that is readily usable by a program. For example, these data structures may include elements that are represented as one or more binary bits in a format suitable for processing by a processor.

On disk, data representing the project 230 may reside in one or more project folders 231. Each project folder 231 may include data regarding one or more items. Items may include, for example, objects, workbooks, sheets, modules, classes, document pages, user interface objects, project properties and settings, other items, and the like. An item may include code and may be stored in a code file such as the code file 232.

The client 210 may host a development environment 220 used for software development. In viewing a document on the server 205, a user may indicate that the user wants to view code associated with the document. For example, the user may press a button in a window of an Internet browser.

In response to this indication, a development environment may be created that allows the user to view, edit, debug, and otherwise interact with code of the document. The development environment may reside on the server 205, the client 210, or one or more other entities (not shown), or have components on the server 205 and the client 210. In one embodiment, the client 210 may create the development environment by executing one or more processes on the client 210. In another embodiment, the client 210 may view a development environment hosted on another entity (e.g., the server 205) via an Internet browser.

In one embodiment, the development controller 245 may be responsible for invoking and configuring the development environment. To do this, the development controller 245 may contact the proxy 240 and obtain data regarding the project 223. Using this data, the development controller 245 may configure the project 224 to be identical or similar (e.g., with changes to file locations, system variables, and the like) to the project 223. For example, the development controller 245 may configure the project 235 to correspond to the project 230, the project folder 236 to correspond to the project folder 231, and the code file 237 to correspond to the code file 232.

The development controller 245 may create or use one or more folders of a file system of the client 210 and may put data corresponding to the project 223 in the one or more folders. To do this, the development controller 245 may create folders on a storage medium of the client and place files and other data in the folders. The folders created on the client may correspond to folders of the project that exist on the server (although they may be named differently). Similarly, the files and other data in the folders on the client correspond to the files and other data of the project that exist on the server (although changes may be made, if needed, to adapt the data in the files to the environment of the client). The development controller 245 may then launch the development environment 220 and configure the development environment 220 to use the data in the one or more folders.

For settings of a project, the development controller 245 may make some changes from corresponding settings in the project 223. For example, the project 223 may refer to certain directories that are specific to the server 205. In configuring the development environment 220, the development controller 245 may map the directories of the server to directories of the client 210. Other configuration data that is specific to the server 205 may also be mapped to apply to the client 210.

In one embodiment, the development controller 245 may provide configuration commands to the development environment 220 via an object model (e.g., collection of objects or classes) exposed by an application programming interface (API) of the development environment 220. In another embodiment, the development controller 245 may be embedded in the development environment 220 and may be able to more directly configure the development environment 220 (e.g., by calling non-exposed objects).

In one embodiment, the development controller 245 may download all the project data of the project 223 and put the project data in suitable locations on the client 210 before invoking the development environment 220. In another embodiment, the development controller may obtain data from the server 205 on an as-needed basis. In this embodiment, the development controller 245 may be embedded in the development environment 220 and may intercept or receive certain calls (e.g., calls to open files, calls to close files, calls for additional data, and so forth). For example, upon receiving a call to open a file, in this embodiment, the development controller 245 may first retrieve the needed file from the server 205 before allowing the call to proceed to a file system I/O component.

In one embodiment, the development controller 245 may reside on the client 210. In another embodiment, the development controller 245 may reside on the server 205 or on another entity (not shown).

A proxy, such as the proxy 240, may be included in the project components 215. The proxy 240 may be operable to receive requests from the development controller 245 and to act to satisfy such requests appropriately. For example, the proxy 240 may receive a request for project data from the development controller 245, may find the requested data, and provide the requested data to the development controller.

In one embodiment, the proxy 240 may indicate that project or files provided to the development controller 245 is/are checked out or otherwise unavailable for editing or changing by other processes until the development controller 245 indicates that the project or files are no longer being used. In another embodiment, the proxy 240 may inform the development controller 245 of changes that occur to code of the project 223 on the server 205 and the development controller 245 may update the development environment 220 accordingly or may follow an algorithm for resolving conflicting updates, if appropriate.

In addition to receiving and responding to requests from the development controller, the proxy 240 may be operable to attempt to communicate with the development controller 245 before allowing pre-defined actions to occur on the server with respect to the server software project. For example, before allowing changes to the project or code within the project, the proxy 240 may communicate with the development controller 245. As another example, the proxy 240 may allow changes if the user does not have a particular code file open on the client but not allow changes if the user does have the code file open.

The examples above are not intended to be all-inclusive or exhaustive of all scenarios in which the proxy 240 may be involved before allowing action to occur to a server software project. Indeed, based on the teachings herein, those skilled in the art may recognize many other scenarios in which it may be appropriate for the proxy 240 to allow or disallow actions to the server software project without departing from the spirit or scope of aspects of the subject matter described herein.

Furthermore, to determine when it needs to be involved, the proxy 240 may be configured to receive or intercept certain commands generated by one or more components of the project components 215 and to take additional actions with respect to these commands.

The proxy 240 may inform the development controller 245 as to changes in the structure of a document associated with the project. For example, a new sheet may be added to a spreadsheet. After a new sheet has been added, the proxy 240 may communicate pertinent data regarding the new sheet to the development controller 245. In response, the development controller may configure the development environment 220 to recognize the new sheet. This may allow, for example, a software developer using the development environment 220 to create code that accesses the new sheet. Furthermore, doing this may allow smart editing tools to inform a software developer of the new sheet during editing via autocompletion or similar techniques.

In one embodiment, a document on the server that is open on the client may initially not have an associated project. While the document is being viewed in the client, a software project for the document may be created. In this embodiment, the proxy 240 may send data to the development controller 245 that the development controller can use to create and configure a development environment for the project on the client 210.

The development controller 245 may send changes that have been made to the project 224 to the proxy 240 at various times. For example, when a user saves the project or a portion thereof, the development controller 245 may send the saved project or portion thereof to the proxy 240. As another example, when a user attempts to execute code of the project via the development environment 220 or close the development environment 220, this may be a trigger that causes the development controller to send the project data to the proxy 240. When the proxy 240 receives these changes, the proxy may update the project 223 as appropriate.

Figure 3:
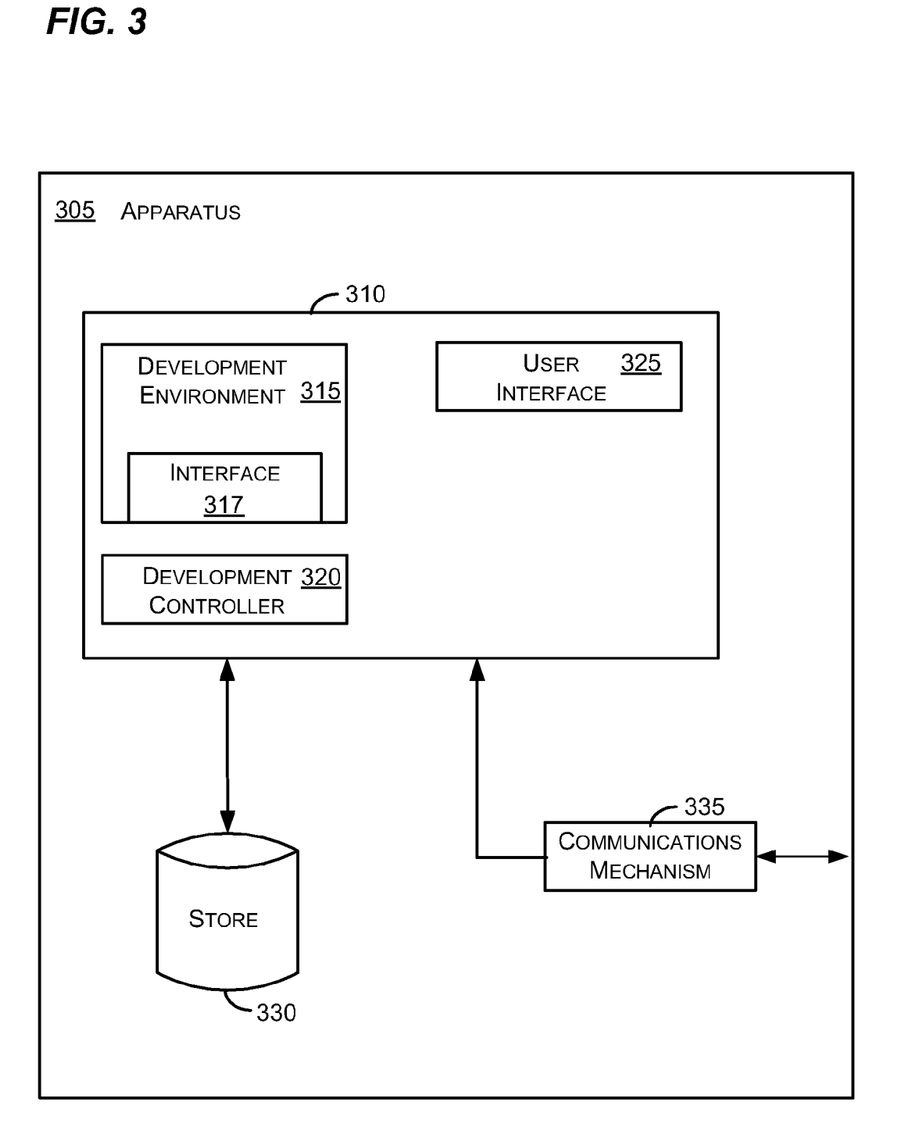
FIG. 3 is a block diagram that represents an apparatus configured to act as a client in accordance with aspects of the subject matter described herein.

FIG. 3 is a block diagram that represents an apparatus configured to act as a client in accordance with aspects of the subject matter described herein. The components illustrated in FIG. 3 are exemplary and are not meant to be all-inclusive of components that may be needed or included. In other embodiments, the components and/or functions described in conjunction with FIG. 3 may be included in other components (shown or not shown) or placed in subcomponents without departing from the spirit or scope of aspects of the subject matter described herein. In some embodiments, the components and/or functions described in conjunction with FIG. 3 may be distributed across multiple devices. The components of FIG. 3 may be implemented by or executed by a processor such as the processing unit 120 of FIG. 1.

The apparatus of FIG. 3 may host or implement the client 210 of FIG. 2. Turning to FIG. 3, the apparatus 305 may include development components 310, a store 330, a communications mechanism 335, and other components (not shown). The apparatus 305 may comprise one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as the apparatus 305 comprises the computer 110 of FIG. 1.

The communications mechanism 335 allows the apparatus 305 to communicate with other entities. For example, the communications mechanism 335 may allow the apparatus 305 to communicate with a server that host server software projects. The communications mechanism 335 may be a network interface or adapter 170, modem 172, or any other mechanism for establishing communications as described in conjunction with FIG. 1.

The store 330 is any storage media capable of providing access to data associated with software development. Access as used herein may include reading data, writing data, deleting data, updating data, a combination including two or more of the above, and the like. The store 330 may comprise a file system, database, volatile memory such as RAM, other storage, some combination of the above, and the like and may be distributed across multiple devices. The store 330 may be external, internal, or include components that are both internal and external to the apparatus 305.

The development components 310 may include a development environment 315, a development controller 320, a user interface 325, and other components (not shown). As used herein, the term component is to be read to include all or a portion of a device, a collection of one or more software modules or portions thereof, some combination of one or more software modules or portions thereof and one or more devices or portions thereof, and the like.

The user interface 325 is operable to receive input indicative of a software project that is hosted on a server. As mentioned previously, in one embodiment, a user may browse documents on a server via an Internet browser. When the user has found a document to which the user which to make changes to a software project, the user may indicate that the user wants to view or edit a software project associated with a document by clicking on a button of the Internet browser (which is displayed via the user interface 325), selecting a menu item, or otherwise interacting with the Internet browser.

The development environment 315 may be operable to host a client software development project and to provide access to the client software development project via the user interface 325. The development environment 315 may include an interface 317 by which the development environment 315 may be configured. As mentioned previously, this interface may expose a collection of objects, classes, functions, or the like that allow outside entities (such as the development controller 320) to configure and control the development environment 315.

The development controller 320 is operable to establish a communication channel with a server and to obtain project data regarding a software project of the server via the communication channel. The project data indicates a structure and code of the software project. In conjunction with obtaining the project data, the development controller 320 is further operable to create a client software project corresponding to the server software project. This client software project may differ from the server software project (e.g., different directories, different system variables, and the like) so that the development environment 315 may access the client software project on the apparatus 305 without having to be aware of the layout of the software project on the server. In conjunction with creating a client software project, the development controller 320 may be further operable to configure the development environment 315 via the interface 317 to access the client software project.

The development controller 320 may operate to provide the server with data indicative of updates made to the client software project. This may occur upon certain events (e.g., a request from the server for any updates, a user closing the development environment 315, a user clicking on a save button of the development environment 315, a user clicking on an execute button of the development environment 315, other events, and the like) as previously mentioned.

The development controller 320 may further operate to receive data indicative of a change made to a structure of a document associated with the server software project and to configure the development environment to recognize the change. For example, a new sheet may be added to a spreadsheet associated with the server software project. As another example, another section may be added to a word processing document associated with the server software project. After the development controller 320 has configured the development environment 315 to recognize the change to the document, the development environment 315 may better assist the user in software development. For example, the development environment 315 may assist in autocompletion activities (e.g., suggesting object, method, or other names) within the development environment. As another example, the development environment 315 may be able to determine whether the code references an existing object of the document and may flag errors as appropriate.

If the user clicks on or otherwise activates an execution control of the development environment to execute code associated with the project, the development controller 320 may provide any updates to the client project to the server and send the server an instruction to execute code of the server software project.

Although the development controller 320 is illustrated as being separate from the development environment 315, in another environment, the development controller 320 may be a part of the development environment. In this embodiment, the development controller 320 may not need to use the interface 317 to configure or control the development environment 315.

FIGS. 4-7 are flow diagrams that generally represent actions that may occur in accordance with aspects of the subject matter described herein. For simplicity of explanation, the methodology described in conjunction with FIGS. 4-7 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Figure 4:
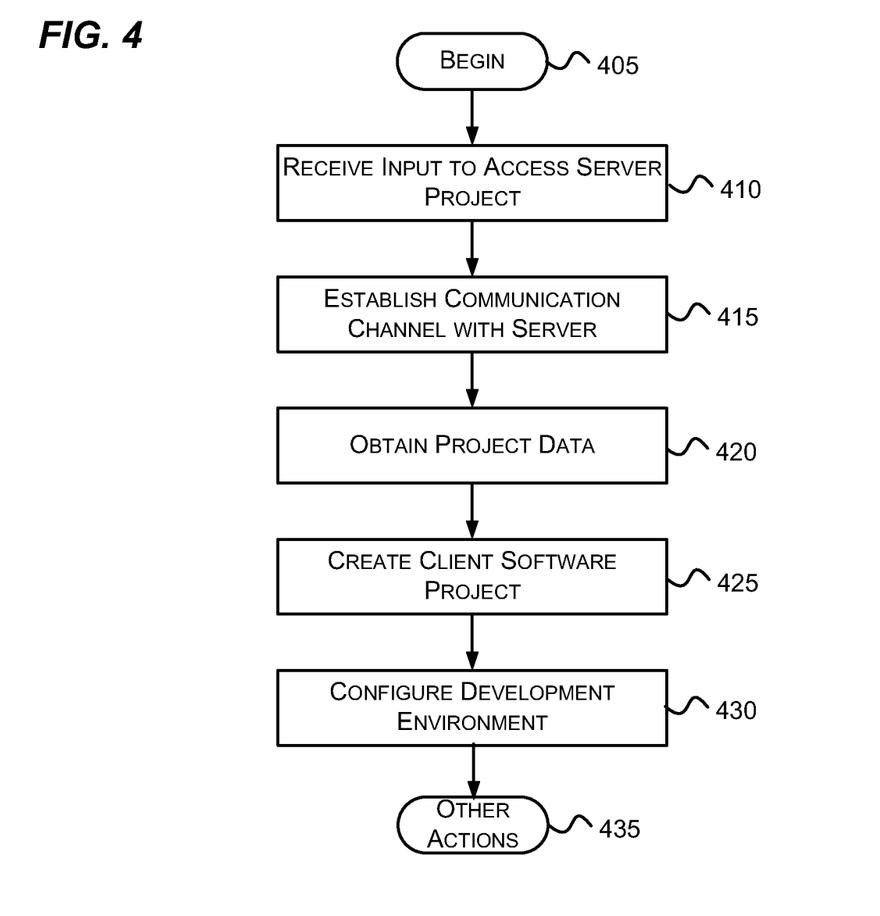
FIGS. 4-5 are flow diagrams that generally represent exemplary actions that may occur on a client in accordance with aspects of the subject matter described herein.
Figure 5:
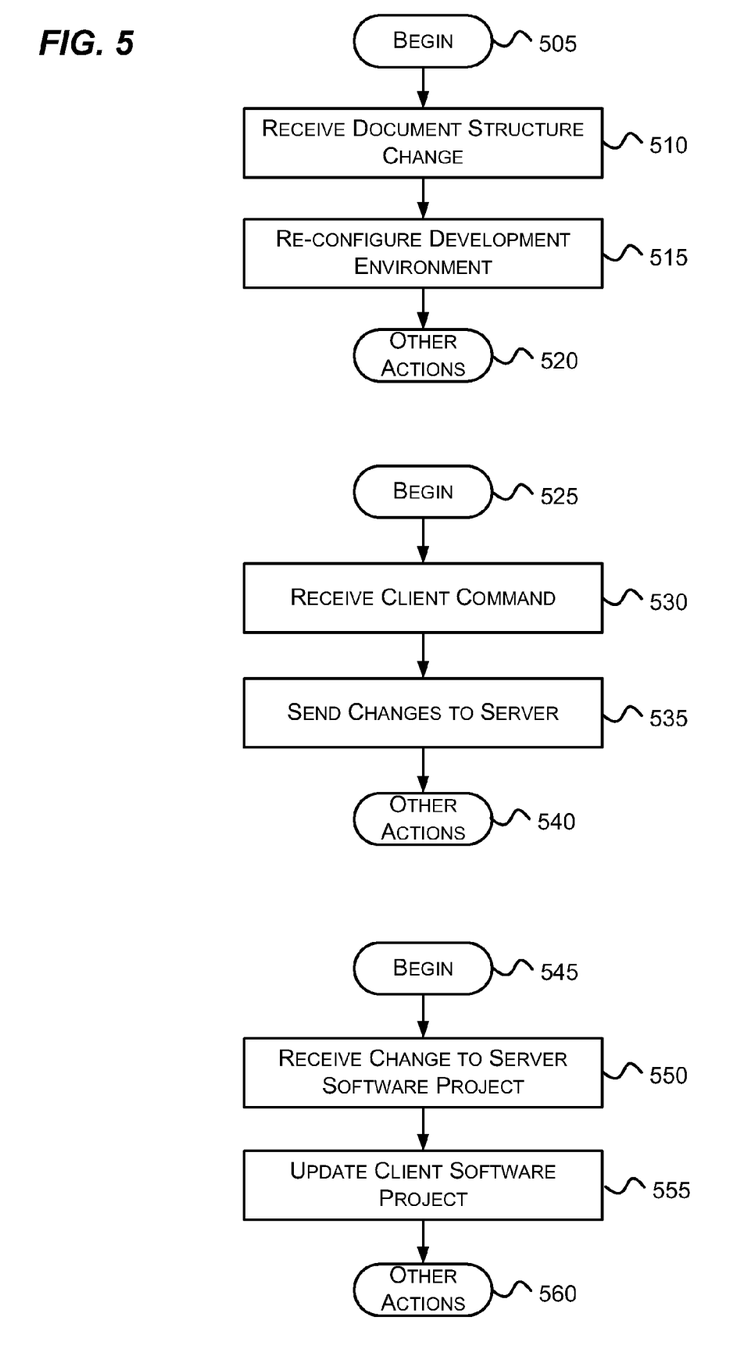

FIGS. 4-5 are flow diagrams that generally represent exemplary actions that may occur on a client in accordance with aspects of the subject matter described herein. Turning to FIG. 4, at block 405, the actions begin. At block 410, input is received to access a software project that is hosted on a server. For example, referring to FIGS. 2-3, the user interface 325 receives an input (e.g., a mouse click on a button) indicating that a user desires to edit a software project 223.

At block 415, a communication channel is established with the server 250. For example, referring to FIG. 2, the development controller establishes a network connection with the proxy 240 of the server 205.

At block 420, project data is obtained from the server. The project data indicates structure and code of the server software project. This structure and code of the server software project may be used to create a client software project corresponding to the server software project. For example, referring to FIG. 2, the development controller 245 obtains project data about the project 223 from the proxy 240.

At block 425, a client software project corresponding to the server software project is created on the client. In one embodiment, this software project may be created using data structures that exist solely in main memory on the client. In another embodiment, this software project may be created using data structures in main memory and/or on disk. For example, referring to FIG. 2, the development controller may create the client software project 224 on the client 210.

At block 430, the development environment is configured as appropriate to access the client software project. For example, referring to FIG. 2, the development environment 220 is configured to access the client software project 224. In one embodiment, configuring the development environment to access the client software project may simply involve indicating a location of a project file on a storage medium of the client. For example, this may be done by passing one or more parameters when invoking the development environment. In another embodiment, this may involve launching the development environment and configuring the development environment using a programming interface to the development environment.

At block 435, other actions, if any, may be performed. Some of the other actions that may occur are illustrated in FIG. 5. Turning to FIG. 5, blocks 505-520 indicate actions that may occur when the document structure on the server changes. For example, at block 505, these actions begin. At block 510, the client receives data indicating a change made to a structure of the document. For example, a sheet may be added to a worksheet of the server. At block 515, the development environment is configured to recognize the change. At block 520, other actions, if any, may be performed.

Blocks 525-540 indicate actions that may occur when events occur on the client. For example, at block 505, these actions begin. At block 530, the development environment of the client may receive a command such as a command to save the project or a portion thereof, a command to close the project, a command to execute code of the project, and the like. In response, at block 535, the client may send data indicative of changes made in the development environment to the server. At block 540, other actions, if any, may be performed.

Blocks 545-560 indicate actions that may occur when changes occur to the server software project. For example, at block 505, these actions begin. At block 550, the client receives data indicating a change made to the server software project. For example, code or objects may be changed, added, or deleted, settings may be changed, or the like. At block 555, the client software project and the development environment may be configured in accordance with the change. At block 560, other actions, if any, may be performed.

Figure 6:
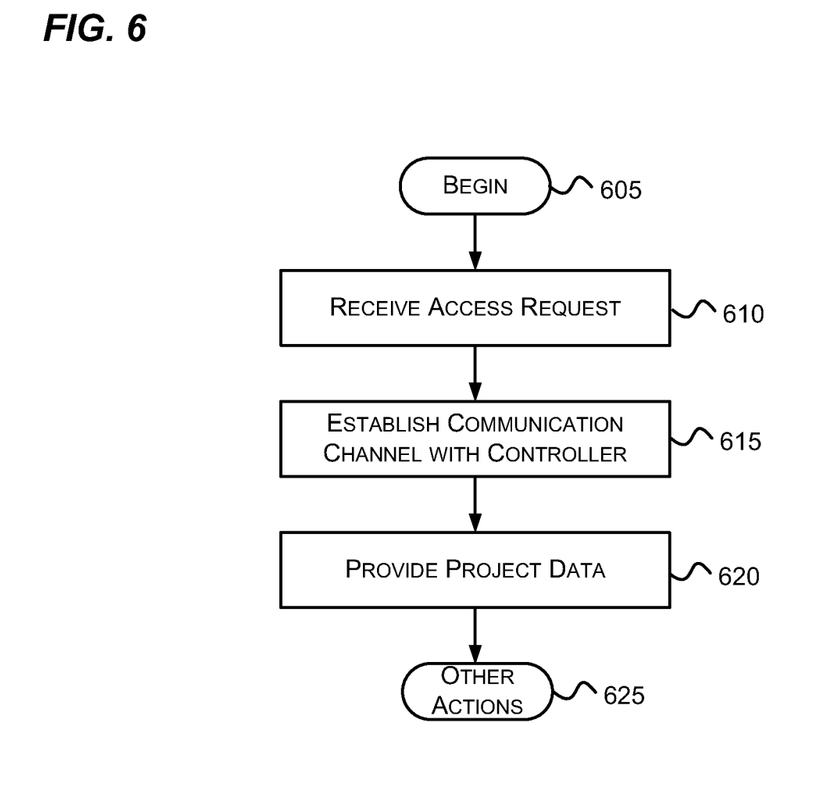
FIGS. 6-7 are flow diagrams that generally represent exemplary actions that may occur on a server in accordance with aspects of the subject matter described herein.
Figure 7:
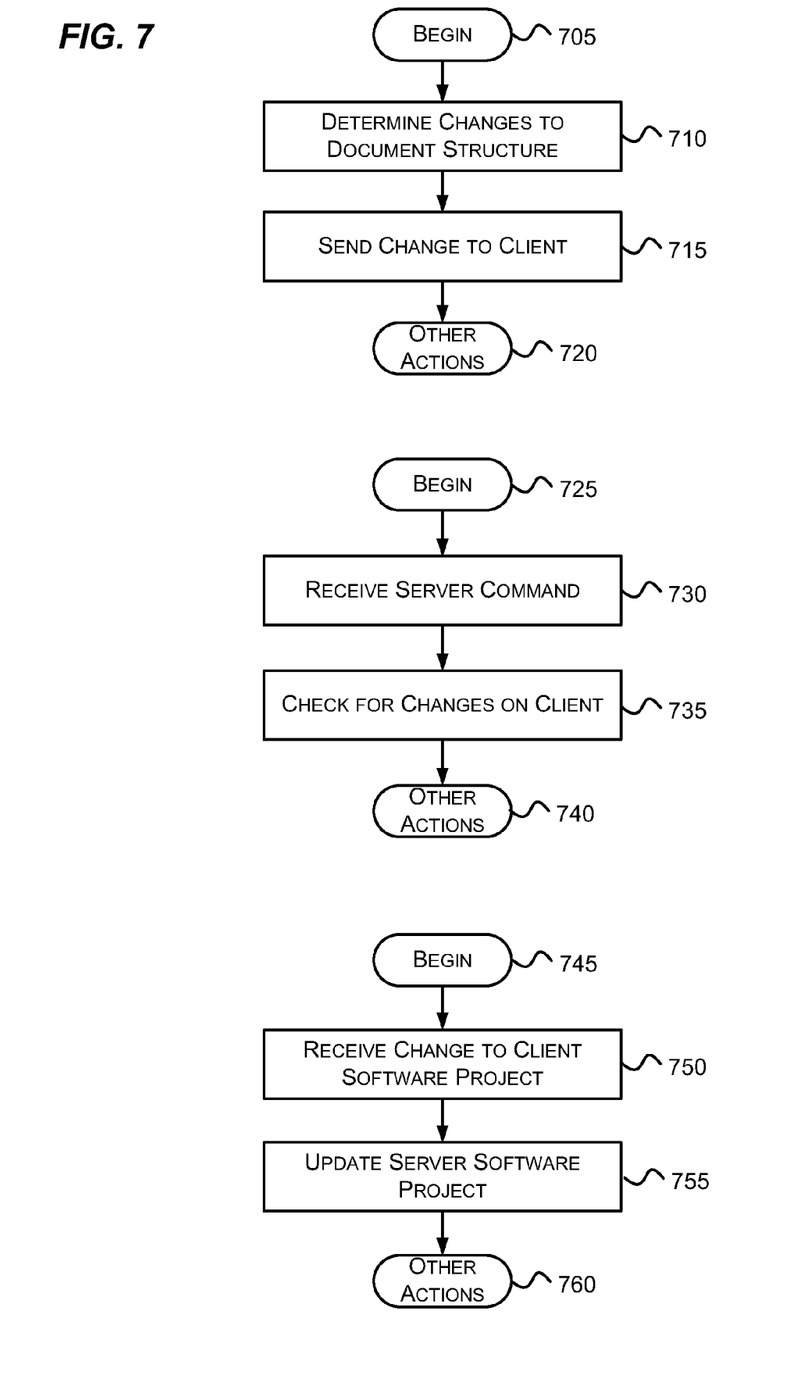

FIGS. 6-7 are flow diagrams that generally represent exemplary actions that may occur on a server in accordance with aspects of the subject matter described herein. Turning to FIG. 6, at block 605, the actions begin.

At block 610, a request to access a server software project is received. For example, referring to FIG. 2, the server 205 may receive a request to access the server software project 223.

At block 615, a communication channel may be established with a development controller of the client. For example, referring to FIG. 2, a communication channel may be established between the proxy 240 and the development controller 245.

At bock 620, data regarding the project is provided to the development controller via the communication channel. This data indicates structure and code of the server software project for use in creating the client software project and configuring the development environment on the client.

At block 625, other actions, if any, may be performed. Some of the other actions that may occur are illustrated in FIG. 7. Turning to FIG. 7, blocks 705-720 indicate actions that may occur when the document structure on the server changes. For example, at block 705, these actions may begin. At block 710, the proxy on the server may determine that the structure of a document is changed. For example, a sheet may be added to a spreadsheet. In response, at block 715, the proxy may send data indicating the change to a development controller of the client. At block 720, other actions, if any, may be performed.

Blocks 725-740 indicate actions that may occur in response to events that occur on the server. At block 725, the actions begin. At block 730, a server command is obtained. If the server command is one for which an updated copy of the project is needed, at block 735, the proxy checks with the client to determine whether any changes have been made on the client. At block 740, other actions, if any may be performed. For example, if changes have been made on the client, the proxy may obtain the changes from the development controller and update the server software project with the changes.

Blocks 745-760 indicate actions that may occur in response to messages from the client. At block 745, the actions begin. At block 750, a change to the project is received from the client. In response, at block 755, the proxy may update the server software project in accordance with the change. If the server receives a message that indicates that the client has or is closing the project, the proxy may remove a lock or change access rights to allow changes or other actions to be taken with respect to the server project. At block 760, other actions, if any, may be performed.

The actions indicated in FIGS. 5 and 7 are not intended to be all-inclusive or exhaustive of other actions that may be taken at the server or client. Based on the teachings herein, those skilled in the art may recognize other actions that may occur on the server or client without departing from the spirit or scope of aspects of the subject matter described herein.

As can be seen from the foregoing detailed description, aspects have been described related to remote project access. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
    at a client, receiving input to access a server software project that is hosted on a server;
    at the client, receiving an indication to view code associated with the server software project;
    in response to the received indication, the client establishing a communication channel with a proxy component of the server, the proxy component operable to communicate with the client in conjunction with one or more pre-defined actions occurring on the server with respect to the server software project;
    the client obtaining project data regarding the server software project from the proxy component, the project data comprising structure and code of the server software project;
    on the client, responsive to the received indication, creating a client software project corresponding to the server software project from the server project data, the client software project differing from the server software project;
    configuring a development environment residing on the client to access the client software project on the client, wherein configuring the development environment residing on the client comprises mapping directories of the server to directories of a file system of the client, wherein creating a client software project corresponding to the server project from the server project data comprises creating folders of the file system of the client and placing files in the folders of the file system of the client, the folders corresponding to folders used on the server for the server software project, the files corresponding to files used on the server for the server software project, wherein configuring a development environment to access the client software project further comprises configuring the development environment to access data in the folders created on the client; and
    receiving an indication to save data of the client software project and, in response, sending data indicative of changes made in the development environment on the client to the proxy component.

2. The method of claim 1, wherein receiving input to access a server software project that is hosted on a server comprises receiving input from a control of an Internet browser hosted on the client, the Internet browser displaying a page that includes a document associated with the server software project, the code, when executed, performing an operation with respect to data of the document.

3. The method of claim 2, further comprising receiving, from the proxy component, data indicating a change made to a structure of the document and, in response, configuring the development environment on the client to recognize the change.

4. The method of claim 1, wherein establishing a communication channel with the proxy component comprises initiating, from the client, a network connection with the proxy component.

5. The method of claim 1, further comprising receiving an indication to close the client software project and, in response, sending to the proxy component data indicating that the client software project is closed or to be closed on the client.

6. The method of claim 1, further comprising receiving data indicating a change made to the server software project and, in response, configuring the client software project and development environment on the client in accordance with the change.

7. In a computing environment, an apparatus, comprising:
a computer comprising a client including:
a user interface operable to receive input indicative of a server software project that is hosted on a server;
a development environment residing on the client operable to host a client software development project and to provide access to the client software development project via the user interface, the development environment including a programming interface by which the development environment may be configured; and
a development controller operable to establish a communication channel with the server and to obtain project data regarding the server software project via the communication channel, the project data indicating a structure and code of the server software project, the development controller further operable to create a client software project corresponding to the server software project, the development controller further operable to configure the development environment of the client via the programming interface to access the client software project on the client, wherein configure the development environment of the client comprises mapping directories of the server to directories of a file system of the client, wherein create a client software project corresponding to the server project from the server project data comprises creating folders of the file system of the client and placing files in the folders of the file system of the client, the folders corresponding to folders used on the server for the server software project, the files corresponding to files used on the server for the server software project, wherein configure the development environment to access the client software project further comprises configure the development environment to access data in the folders created on the client,
the user interface further operable to receive an indication to save data of the client software project and, in response, to send data indicative of changes made in the development environment on the client to the proxy component.

8. The apparatus of claim 7, wherein the development controller is further operable to provide, to the server, data indicative of updates made to the client software project.

9. The apparatus of claim 7, wherein the development controller is further operable to provide, to the server, an instruction to execute code of the server software project.

10. The apparatus of claim 7, wherein the development controller is further operable to receive data indicative of a change made to a structure of a document associated with the server software project and to configure the development environment to recognize the change for autocompletion activities within the development environment.

11. A computer storage memory having computer-executable instructions, which when executed perform actions, comprising:
at a client, receiving input to access a server software project that is hosted on a server;
at the client, receiving an indication to view code associated with the server software project;
in response to the received indication, the client establishing a communication channel with a proxy component of the server, the proxy component operable to communicate with the client in conjunction with one or more pre-defined actions occurring on the server with respect to the server software project;
the client obtaining project data regarding the server software project from the proxy component, the project data comprising structure and code of the server software project;
on the client, responsive to the received indication, creating a client software project corresponding to the server software project from the server project data, the client software project differing from the server software project;
configuring a development environment residing on the client to access the client software project on the client, wherein configuring the development environment residing on the client comprises mapping directories of the server to directories of a file system of the client, wherein creating a client software project corresponding to the server project from the server project data comprises creating folders of the file system of the client and placing files in the folders of the file system of the client, the folders corresponding to folders used on the server for the server software project, the files corresponding to files used on the server for the server software project, wherein configuring a development environment to access the client software project further comprises configuring the development environment to access data in the folders created on the client; and
receiving an indication to save data of the client software project and, in response, sending data indicative of changes made in the development environment on the client to the proxy component.

12. The computer storage memory of claim 11, wherein receiving input to access a server software project that is hosted on a server comprises receiving input from a control of an Internet browser hosted on the client, the Internet browser displaying a page that includes a document associated with the server software project, the code, when executed, performing an operation with respect to data of the document.

13. The computer storage memory of claim 12, having further computer-executable instructions, which when executed perform actions comprising receiving, from the proxy component, data indicating a change made to a structure of the document and, in response, configuring the development environment on the client to recognize the change.

14. The computer storage memory of claim 11, wherein establishing a communication channel with the proxy component comprises initiating, from the client, a network connection with the proxy component.

15. The computer storage memory of claim 11, having computer-executable instructions, which when executed perform actions comprising receiving an indication to close the client software project and, in response, sending to the proxy component data indicating that the client software project is closed or to be closed on the client.

16. The computer storage memory of claim 11, having further computer-executable instructions, which when executed perform actions comprising receiving data indicating a change made to the server software project and, in response, configuring the client software project and development environment on the client in accordance with the change.

\* \* \* \* \*